April 27, 1954     K. R. AMELN     2,677,006
ALKALINE ELECTRIC STORAGE BATTERY CELL
Filed Oct. 10, 1950
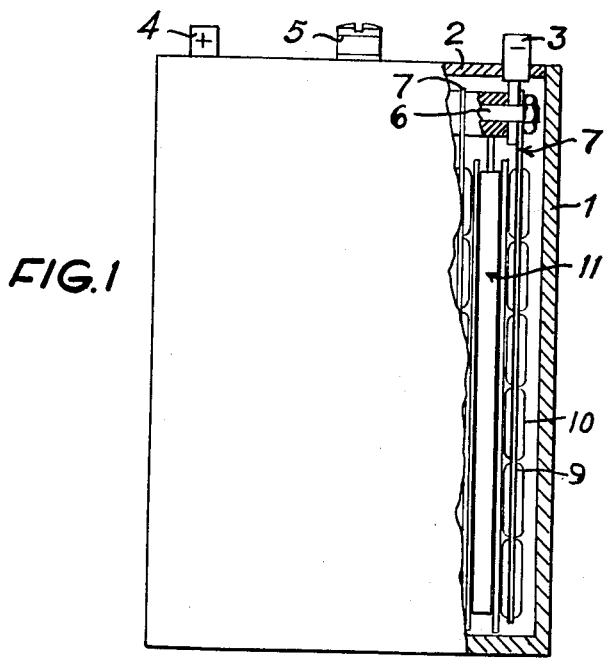
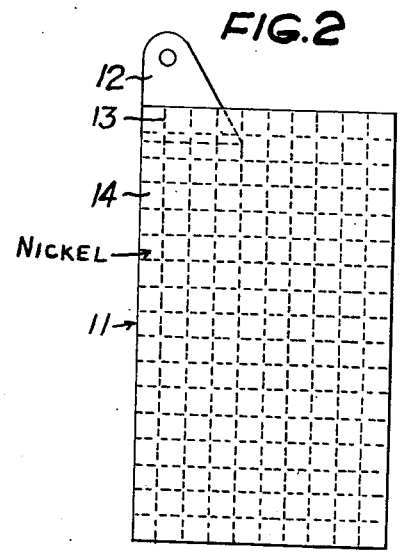
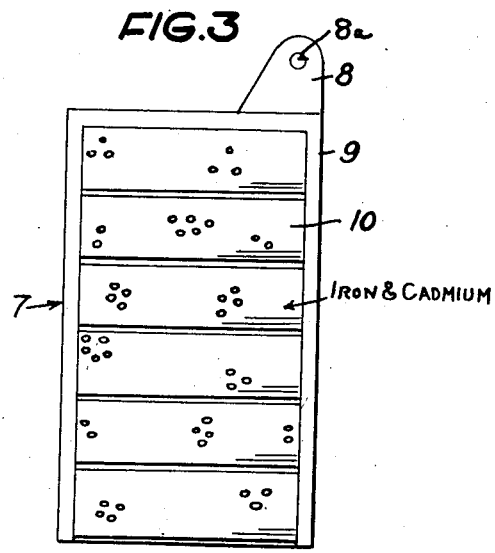
INVENTOR
Karl Robert Ameln
BY Pierce, Scheffler & Parker
ATTORNEYS Patented Apr. 27, 1954

2,677,006

UNITED STATES PATENT OFFICE 2,677,006

ALKALINE ELECTRIC STORAGE BATTERY CELL

Karl Robert Ameln, Stockholm, Sweden, assignor to Svenska Ackumulator Aktiebolaget Jungner, Stockholm, Sweden, a corporation of Sweden Application October 10, 1950, Serial No. 189,480

Claims priority, application Sweden October 12, 1949

13 Claims. (Cl. 136—20)

Alkaline accumulators of an earlier construction, for example of the Jungner or Edison construction, have very good properties, when the current taken out of them is not too large relatively to the capacity. The internal resistance, however, is relatively high, which makes them less suitable for a high-power discharge during short periods. In a further construction of alkaline accumulators, the electrodes are constituted by porous members of a conducting material containing active material. If desired, the porous member may consist of one or more pieces enclosed within an external shell. Accumulators made in this manner have a considerably lower internal resistance than those constructed according to the old methods, but on the other hand they are more expensive in manufacture and have in certain cases a comparatively restricted life.

Through the present invention it will be possible to devise electric elements for accumulators of a low internal resistance, an extended life and a relatively low price. According to the invention, the electric cell is distinguished above all by a new combination of two different and already known types of electrodes, the electrodes being constituted by one or more positive electrodes comprising porous, preferably highly porour conducting members containing an active material, in combination with one or more negative electrodes comprising sleeves, so-called pockets, of perforated sheet metal containing active material in a pulverulent state. Here, the expression "highly porous" is understood to involve a porosity of a pore volume of about 80 to 90% of the volume of the member in consideration. The highly porous member may be made in various manners, and particularly by the sintering of powder of metal. A powder particularly suited for the purpose in consideration may be obtained by decomposing the corresponding metal carbonyl of the metals, where this method is suitable with respect to the formation and decomposition temperatures of the carbonyl. It may also be obtained by reduction and sintering of some corresponding metal oxide in a pulverulent state. Powder of metal or oxide may then be admixed with a substance which yields gases when heated. If, namely, such a mixture is heated to a suitable temperature, the grains of the powder are caused to sinter together, but the gases prevent the grains from flowing together into a solid material; instead, a highly porous body is formed.

The advantage of making the positive electrode (the plate) of a highly porous material as a carrier of the active material, while the negative electrode is at the same time of a different construction, depends on the following circumstances:

The internal resistance of an accumulator cell may be conceived of as being composed of substantially three factors, that is to say the resistance of the positive electrode, that of the electrolyte, and that of the negative electrode.

In alkaline accumulators, the resistance of the positive plate is almost always predominating. For this reason, a substantial lowering of the internal resistance will manifest itself in an alkaline cell of the ordinary type, if the positive electrode is replaced by an electrode containing a highly porous conducting body of a suitable construction with an active material. It has also been found that positive electrodes of this construction have a longer life than that of positive electrodes of an earlier construction. On the other hand, negative electrodes manufactured in a similar manner generally have a shorter life than that of negative electrodes of an earlier construction.

Positive electrodes containing highly porous bodies of a conducting material comprising an active material may also be combined with other kinds of electrodes, such as zinc electrodes of a suitable construction. In these cases, the metal of the sintered body and the active material will obviously have to be selected with respect to the other electrode and to the electrolyte. In a zinc electrode in an alkaline electrolyte, the porous body may consist of nickel or silver, while the active material is constituted by nickel hydroxide or silver-oxide. Instead of using silver or nickel alone as a conducting material, it is possible to make the porous body from a frame of some other material, such as metal or carbon, coated by nickel or silver over the whole of the surface thereof.

The negative electrode may contain a mixture of finely divided iron and cadmium or iron with an admixture of mercuric oxide, and otherwise it may be constructed in the ordinary manner known from accumulators of the Jungner or Edison type. According to a modification of the invention, it is possible, however, to make the negative electrode from a highly porous conducting body containing an active material, the positive electrode being then made to another pattern, known perchance, for instance to the pattern of the Jungner or Edison type.

In cases where the electrodes contain pulverulent or grainy material, an external pressure on the electrode is sometimes required to ensure safe contact between the grains mutually and between the grains and the connecting electrode. In these cases, it will be found suitable to enclose the element in a resilient casing, or to provide the casing with resilient means to keep the electrodes under a sufficient pressure.

In the accompanying drawings,

Fig. 1 is an elevation partly in section of an accumulator according to the invention, Fig. 2 is an elevation of a positive plate of the accumulator, and Fig. 3 is an elevation of a negative plate for the same accumulator.

In the drawing, 1 designates a container and 2 a cover at the top thereof. Mounted in the cover are the two terminals 3 and 4, and a valve 5 intended to allow supply of electrolyte and water and escape of developed gases.

Each negative electrode element of the accumulator indicated by the general reference numeral 7 and shown in side elevation in Fig. 3 is seen to be comprised of an electrically conductive frame 9 having an apertured ear 8 upstanding thereon at one corner and a plurality of pockets 10 formed from thin perforate sheet-metal supported by and within the frame. Such sheet-metal may consist of iron, iron plated with nickel, or of nickel, and the pockets are filled with the active material which as explained above can be comprised of cadmium or iron or cadmium and iron, or iron with an admixture of mercury oxide (in the loaded state of the accumulator).

The several negative plates 7 are arranged in spaced parallel relation within the container 1 and a collecting bolt 6 which is secured to terminal 3 is passed through an aperture 8a in the several aligned ears 8 to electrically interconnect the negative plates.

The terminal 4 which may be located diagonally opposite the terminal 3 in the cover 2, is secured to another collecting bolt not shown for interconnecting the several parallel spaced positive plates 11 which alternate with the negative plates 7 in the same manner as the terminal 3 is connected to the collecting bolt 6 for the negative plates 7. As indicated in the drawing the positive plates 11 may comprise an ear 12 attached to a net 13, the attachment being made preferably by sintering. The ear 12 and the net 13 may be made from nickel or iron plated with nickel. The net is embedded in a porous layer 14 of nickel. Said layer has been produced by sintering nickel powder, preferably powder obtained by disintegration of nickel carbonyl. The pores of this layer are filled with nickel hydroxide, which has been made by impregnation of the layer with a nickel salt and precipitation by means of alkaline hydroxide, optionally completed with cathodic polarization.

What I claim is:

1. An electric storage battery cell of the alkaline type having two different types of electrodes, said electrodes being constituted by one or more positive electrodes comprising porous conducting bodies of sintered metal powder, said bodies containing active material in their pores, in combination with one or more negative electrodes comprising pockets of perforate sheet metal containing active material in a pulverulent state.

2. An electric storage battery cell as defined in claim 1 characterized by the fact that the active material of the negative electrodes is under pressure.

3. An electric storage battery cell of the alkaline type having two different types of electrodes, said electrodes being constituted by one or more positive electrodes comprising porous conducting bodies of reduced and sintered metal oxide in a pulverulent state, said bodies containing active material in their pores, in combination with one or more negative electrodes comprising pockets of perforate sheet metal containing active material in a pulverulent state.

4. An electric storage battery cell of the alkaline type having two different types of electrodes, said electrodes being constituted by one or more positive electrodes comprising porous bodies of sintered nickel powder with nickel hydroxide as an active material, in combination with one or more negative electrodes comprising pockets of perforate sheet metal containing active material in a pulverulent state.

5. An electric storage battery cell of the alkaline type having two different types of electrodes, said electrodes being constituted by one or more positive electrodes comprising porous bodies of a sintered metal powder coated with nickel and with nickel hydroxides as an active material, in combination with one or more negative electrodes comprising pockets of perforate sheet metal containing active material in a pulverulent state.

6. An electric storage battery cell of the alkaline type having two different types of electrodes, said electrodes being constituted by one or more positive electrodes comprising porous conducting bodies of sintered nickel powder provided with an active material comprising silver oxide, in combination with one or more negative electrodes comprising pockets of perforate sheet metal containing active material in a pulverulent state.

7. An electric storage battery cell of the alkaline type having two different types of electrodes, said electrodes being constituted by one or more positive electrodes comprising porous conducting bodies of sintered silver powder, said bodies containing an active material of silver-oxide in their pores, in combination with one or more negative electrodes comprising pockets of perforate sheet metal containing active material in a pulverulent state.

8. An electric storage battery cell of the alkaline type having two different types of electrodes, said electrodes being constituted by one or more positive electrodes comprising porous conducting bodies of sintered metal powder coated with nickel, said bodies containing active material of silver oxide in their pores, in combination with one or more negative electrodes comprising pockets of perforate sheet metal containing active material in a pulverulent state.

9. An electric storage battery cell of the alkaline type having two different types of electrodes, said electrodes being constituted by one or more positive electrodes comprising porous conducting bodies of sintered metal powder coated with silver and provided with an active material consisting of or containing silver oxide in their pores, in combination with one or more negative electrodes comprising pockets of perforate sheet metal containing active material in a pulverulent state.

10. An electric storage battery cell of the alkaline type having two different types of electrodes, said electrodes being constituted by one or more positive electrodes comprising porous conducting bodies of sintered metal powder, said bodies containing active material in their pores, in combination with one or more negative electrodes comprising pockets of perforate sheet metal containing active material consisting of a mixture of finely divided iron and cadmium.

11. An electric storage battery cell of the alkaline type having two different types of electrodes, said electrodes being constituted by one or more positive electrodes comprising porous conducting bodies of sintered metal powder, said bodies containing active material in their pores, in combination with one or more negative electrodes comprising pockets of perforate sheet metal containing finely divided iron with an admixture of mercuric oxide.

12. An electric storage battery cell of the alkaline type having two different types of electrodes, said electrodes being constituted by one or more positive electrodes comprising porous conducting bodies of sintered metal powder, said bodies containing active material in their pores, in combination with one or more negative electrodes comprising pockets of perforate sheet metal containing active material comprising zinc powder.

13. An electric storage battery cell of the alkaline type having two different types of electrodes, said electrodes being constituted by one or more positive electrodes comprising porous bodies of sintered metal powder with nickel hydroxide as an active material, in combination with one or more negative electrodes comprising pockets of perforate sheet metal containing active material consisting of a mixture of finely divided iron and cadmium.

References Cited in the file of this patent

UNITED STATES PATENTS

| Number | Name | Date |
| --- | --- | --- |
| 897,833 | Hubbell | Sept. 1, 1908 |
| 1,073,107 | Edison | Sept. 16, 1913 |
| 1,377,194 | Edison | May 10, 1921 |
| 1,379,088 | Edison | May 24, 1921 |
| 1,740,518 | Miller | Dec. 24, 1929 |
| 1,885,451 | Kraenzlein et al. | Nov. 1, 1932 |
| 1,940,385 | Ackerman | Dec. 19, 1933 |
| 1,955,115 | Drumm | Apr. 17, 1934 |
| 2,213,128 | Langguth | Aug. 27, 1940 |
| 2,561,943 | Moulton et al. | July 24, 1951 |

FOREIGN PATENTS

| Number | Country | Date |
| --- | --- | --- |
| 487,607 | Great Britain | June 23, 1938 |